Oct. 30, 1923.
U. M. RICHARDSON
TOOTH CONSTRUCTION
Filed April 17, 1922
1,472,678
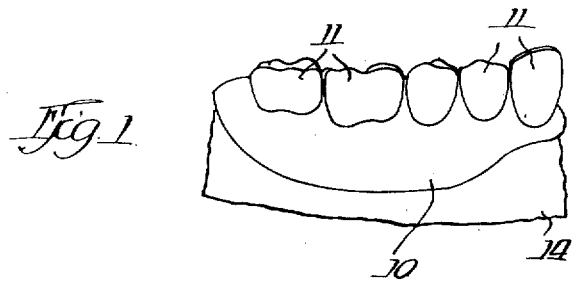
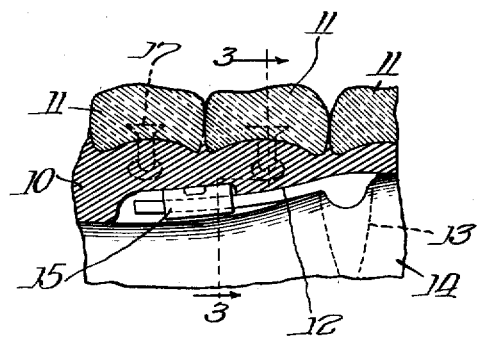
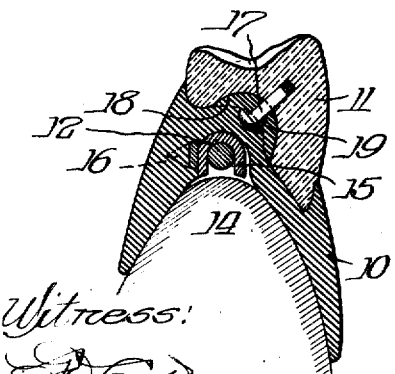
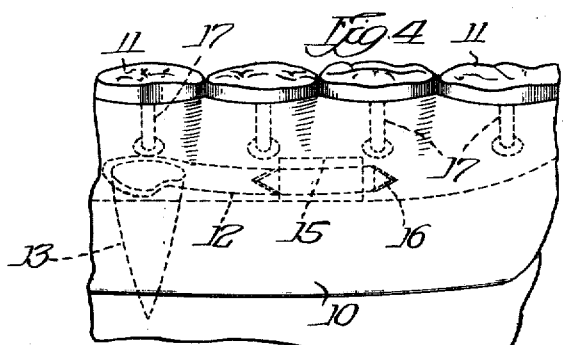

Patented Oct. 30, 1923.

1,472,678

UNITED STATES PATENT OFFICE.

ULYSSES M. RICHARDSON, OF CHICAGO, ILLINOIS, ASSIGNOR OF ONE-HALF TO JAMES B. CROWLEY, OF CHICAGO, ILLINOIS.

TOOTH CONSTRUCTION.

Application filed April 17, 1922. Serial No. 554,257.

*To all whom it may concern:*

Be it known that I, ULYSSES M. RICHARDSON, a citizen of the United States, and resident of Chicago, in the county of Cook and State of Illinois, have invented certain new and useful Improvements in Tooth Construction, of which the following is a specification.

My invention relates to dental practice and particularly to artificial tooth construction and arrangement relative to plate work.

In the construction of full or partial plates, it is customary to provide, whenever possible, an attaching device, usually in the form of a lateral projection from a stump, and a cooperating clasp carried by the plate. This attaching device necessarily lies above the gums and in the space separating the tooth therefrom and the strength of the plate is dependent upon the body of rubber which may be accommodated in that space. It is essential that the tooth be provided with an anchoring device which in common usage consists of a pin projecting from the under surface of the tooth and provided with a head adapted to be embedded in the vulcanized rubber comprising the plate. The head of the pin will, therefore, reach a point adjacent to the attachment device and as heretofore used, restrict the cross-section of rubber at that point.

In my improved construction I utilize a similar attaching device and employ a tooth having an anchoring pin, but I hollow out the tooth adjacent to the pin and provide a cavity of ample size within which a substantial body of rubber may be received. The head of the pin is thereby anchored in a body of rubber and a full cross section of material is provided at the point which was heretofore weak. The result is secured without weakening the tooth or increasing the cost of manufacture thereof.

The shape and, more particularly, the thickness of the different teeth, together with their proper location with respect to the plate-ridge, determines to a considerable extent the shape and disposition of the ridge-lap or mounting surfaces of the several teeth. For example, the incisors are comparatively thin in body and their axes properly lie forward of the plate-ridge; consequently, the ridge-lap or mounting surface of each incisor must be one which extends at an oblique angle to the axis of the tooth, while the molars, being thicker in body, are properly positioned with their axes more directly over or atop the plate-ridge, and their ridge-lap or mounting surfaces usually comprise a channel or groove which provides a shoulder for extension partly over or across the plate-ridge. I am aware that artificial teeth have heretofore been provided with headed pins which project from their ridge-lap or mounting surfaces, and that countersunk headed pins have been used. My invention is believed to constitute an easily recognizable improvement upon each of these former methods. By my arrangement of the headed pin in a cavity or recess in the tooth body, I provide for a sufficiently deep investment of the pin-head in the vulcanized rubber to obtain a firm and structurally strong attachment of the tooth to the plate and at the same time obtain a thicker rubber plate structure at this important point.

The invention will be more readily understood by reference to the accompanying drawing, in which, Fig. 1 is an elevation of a partial denture to which my improved tooth has been applied;

Fig. 2 is a longitudinal vertical sectional view therethrough;

Fig. 3 is a transverse vertical sectional view on the line 3—3 of Fig. 2;

Fig. 4 is a side elevation of the construction shown in Fig. 3, and,

Fig. 5 is a side view of an individual tooth.

While the improved tooth is adapted for general application to all forms of plate work, is. is shown in connection with a partial plate consisting of a vulcanite saddle 10, the teeth of different forms being indicated at 11. From the cross section shown in Figs. 3 and 5 it will be observed that my arrangement of the cavity or recess in the tooth body affords a substantially tooth-supporting shoulder without weakening the tooth structure. The tooth is particularly useful in cases where an attaching device is employed. Such a device may consist of an arm 12, anchored to a stump 13, and projecting horizontally in line with the top of the gum indicated at 14. A clasp 15 is provided with projections 16, which serve as a means for anchoring the clasp in the plate. As shown in Figs. 2 and 3, the U-shaped clasp is adapted to cooperate with the arm 12, to hold the plate in position. When a tooth having the usual anchoring pin is applied adjacent to a fastening device, it results in weakening the structure due to the fact that there is an insufficient cross section of material at the point of engagement. In order to overcome this deficiency I provide the tooth 11 with a headed pin 17, the pin being substantially centrally located within a cavity 18, formed in the lower face of the tooth. The pin head need not project outside of the plane of the lower surface but is nevertheless securely held within a suitable body of vulcanite such as is indicated at 19. There is therefore no weakening of the plate due to the employment of any of the well known forms of attaching devices.

Furthermore by my arrangement of the pin at a pronounced oblique angle to the axis of the tooth, twisting of the tooth by this action is prevented and consequently the liability of loosening of the tooth in this manner is obviated.

The application of the improvement is adapted to be made to many different forms of artificial dentures, only one illustration of such forms being provided.

I claim:

An artificial tooth having a ridge-lap or mounting surface provided with a cavity extending from said surface into the body of the tooth, and a headed pin secured in said body to project from the wall of said cavity at a pronounced angle to the vertical axis of the tooth, the headed end of said pin being substantially flush with said mounting surface.

Signed at Chicago, Ill., this 14th day of April, 1922.

ULYSSES M. RICHARDSON.

DISCLAIMER 1,472,678.—*Ulysses M. Richardson*, Chicago, Ill. TOOTH CONSTRUCTION. Patent dated October 30, 1923. Disclaimer filed May 6, 1932, by the *Patentee*, and the assignee of one-half interest, *James B. Crowley*.

Hereby disclaim from the scope of the claim of said patent all single pin artificial teeth which are not designed for pressing into a rubber plate to be vulcanized therein to form a permanent union; all such teeth which have a part of the wall of the cavity substantially undercut to form an overhanging portion, which have walls on less than two sides of the pin, and which do not have the pin secured to the lingual side thereof.

[*Official Gazette May 24, 1932.*]